(12) United States Patent
Burns et al.

(10) Patent No.: US 9,438,440 B2
(45) Date of Patent: Sep. 6, 2016

(54) PROXIMITY DETECTION OF INTERNET OF THINGS (IOT) DEVICES USING SOUND CHIRPS

(71) Applicant: QUALCOMM Incorporated, San Diego, CA (US)

(72) Inventors: Gregory Burns, Seattle, WA (US); Marcello Lioy, Mercer Island, WA (US); Eric Rongo, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/339,919

(22) Filed: Jul. 24, 2014

(65) Prior Publication Data

US 2015/0029880 A1    Jan. 29, 2015

Related U.S. Application Data

(60) Provisional application No. 61/859,443, filed on Jul. 29, 2013.

(51) Int. Cl.
*H04L 12/28* (2006.01)
*H04W 84/00* (2009.01)
*G01S 11/16* (2006.01)
*H04W 84/18* (2009.01)
(Continued)

(52) U.S. Cl.
CPC ............ *H04L 12/2803* (2013.01); *G01S 11/16* (2013.01); *H04L 41/0876* (2013.01); *H04L 67/12* (2013.01); *H04W 4/005* (2013.01); *H04W 4/008* (2013.01); *H04W 84/00* (2013.01); *H04W 84/18* (2013.01)

(58) Field of Classification Search
None
See application file for complete search history.

(56) References Cited

U.S. PATENT DOCUMENTS

| 4,751,689 | A | 6/1988 | Kobayashi |
| 7,693,040 | B1 * | 4/2010 | Bhugra ............... H04L 27/2647 370/208 |

(Continued)

FOREIGN PATENT DOCUMENTS

| GB | 2367618 A | 4/2002 |
| WO | 2008065691 A1 | 6/2008 |

(Continued)

OTHER PUBLICATIONS

International Search Report—PCT/US2014/048166—ISA/EPO—Oct. 29, 2014.

(Continued)

*Primary Examiner* — Derrick Ferris
*Assistant Examiner* — Jay Vogel
(74) *Attorney, Agent, or Firm* — Muncy, Geissler, Olds & Lowe, P.C.

(57) ABSTRACT

In an embodiment, a connection is established between first and second Internet of Things (IoT) devices. After a determination is made to execute a proximity detection procedure, the second IoT device outputs an audio emission and a data packet at substantially the same time. The first IoT device detects the audio emission via a microphone and receives the data packet. The first IoT device uses correlation information to correlate the detected audio emission with the data packet, whereby the correlation information is contained in the detected audio emission, the data packet or both. The first IoT device uses the correlation between the detected audio emission and the data packet to calculate a distance estimate between the first and second IoT devices.

32 Claims, 17 Drawing Sheets

(51) Int. Cl.
*H04L 29/08* (2006.01)
*H04W 4/00* (2009.01)
*H04L 12/24* (2006.01)

(56) References Cited

U.S. PATENT DOCUMENTS

| | | | |
|---|---|---|---|
| 7,729,204 | B2 | 6/2010 | Peng et al. |
| 8,224,351 | B1 | 7/2012 | Sushkov et al. |
| 8,447,329 | B2 | 5/2013 | Kadirkamanathan et al. |
| 2003/0036378 | A1* | 2/2003 | Dent ............... G06Q 20/327 455/414.1 |
| 2004/0003250 | A1 | 1/2004 | Kindberg et al. |
| 2006/0098613 | A1* | 5/2006 | Kish ............... H04N 21/6405 370/338 |
| 2009/0233551 | A1 | 9/2009 | Haartsen et al. |
| 2010/0130229 | A1* | 5/2010 | Sridhara ............ G01S 19/49 455/456.1 |
| 2011/0151944 | A1* | 6/2011 | Morgan ............ H04W 52/0258 455/574 |
| 2011/0292820 | A1* | 12/2011 | Ekbal ............... G01S 13/765 370/252 |
| 2012/0263020 | A1 | 10/2012 | Taylor et al. |
| 2013/0130714 | A1 | 5/2013 | Huibers et al. |
| 2013/0163453 | A1* | 6/2013 | Lin ............... H04W 64/00 370/252 |

FOREIGN PATENT DOCUMENTS

| | | |
|---|---|---|
| WO | 2009029980 A1 | 3/2009 |
| WO | 2009066212 A1 | 5/2009 |

OTHER PUBLICATIONS

Lazik P., et al., "Indoor Pseudo-Ranging of Mobile Devices using Ultrasonic Chirps," SenSys '12 Proceedings of the 10th ACM Conference on Embedded Network Sensor Systems, Nov. 2012, pp. 99-112.

Priyantha, N.B., et al., "The Cricket Location-Support System," 6th ACM International Conference on Mobile Computing and Networking (ACM MOBICOM), Boston, MA, Aug. 2000, 12 pages.

* cited by examiner

PROXIMITY DETECTION OF INTERNET OF THINGS (IOT) DEVICES USING SOUND CHIRPS

CLAIM OF PRIORITY UNDER 35 U.S.C. §119

The present application for Patent claims priority to Provisional Application No. 61/859,443, entitled "PROXIMITY DETECTION OF INTERNET OF THINGS (IoT) DEVICES USING SOUND CHIRPS", filed on Jul. 29, 2013, by the same inventors as the subject application, assigned to the assignee hereof and hereby expressly incorporated by reference herein in its entirety.

FIELD

Embodiments relate to proximity detection of Internet of Things (IoT) devices using sound chirps.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. However, despite the fact that IoT capable devices can provide substantial real-time information about the environment surrounding a user (e.g., likes, choices, habits, device conditions and usage patterns, etc.), it can be relatively difficult for different IoT devices to determine if they are in close physical proximity to each other.

SUMMARY

In an embodiment, a connection is established between first and second Internet of Things (IoT) devices. After a determination is made to execute a proximity detection procedure, the second IoT device outputs an audio emission and a data packet at substantially the same time. The first IoT device detects the audio emission via a microphone and receives the data packet. The first IoT device uses correlation information to correlate the detected audio emission with the data packet, whereby the correlation information is contained in the detected audio emission, the data packet or both. The first IoT device uses the correlation between the detected audio emission and the data packet to calculate a distance estimate between the first and second IoT devices.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
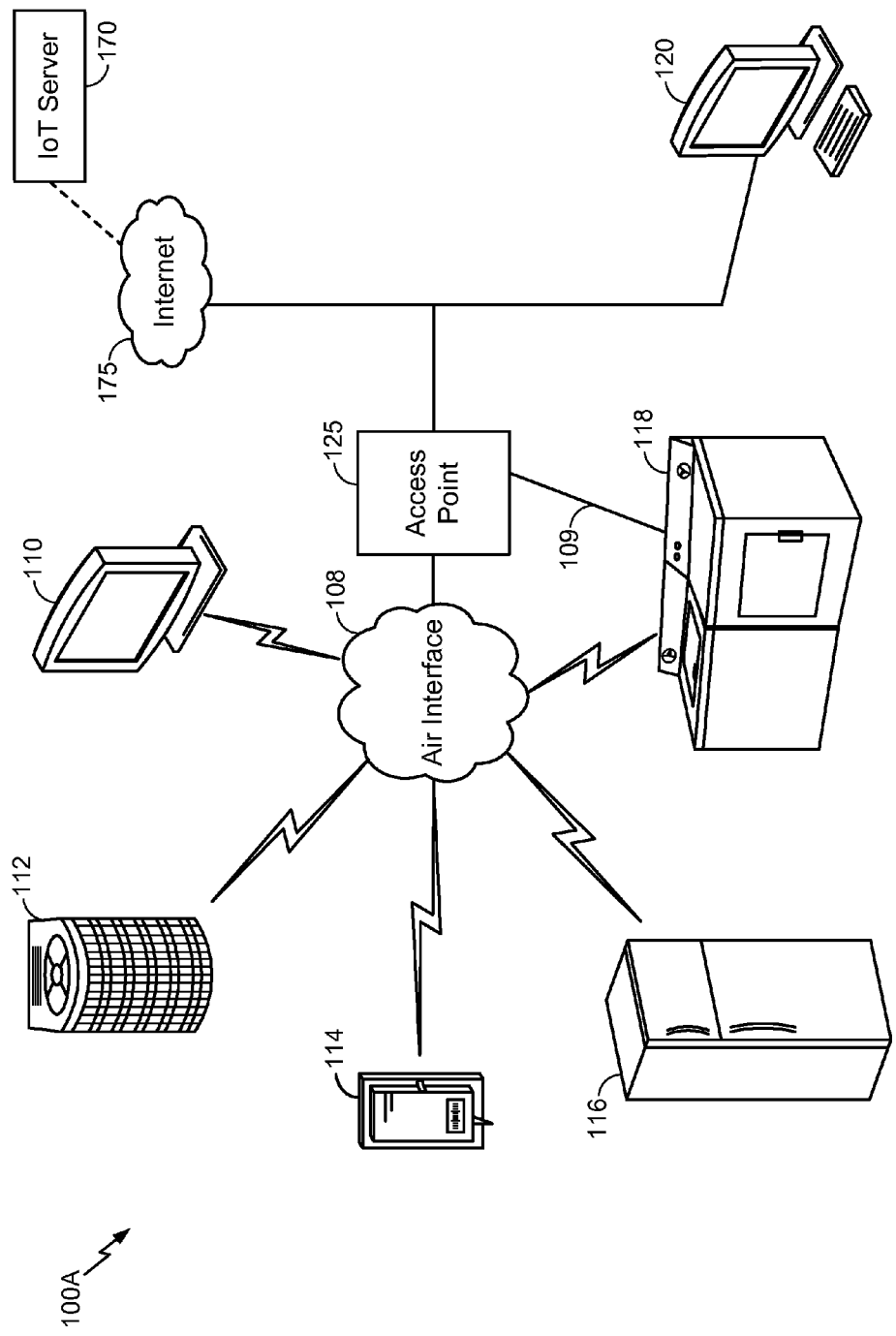
FIG. 1A illustrates a high-level system architecture of a wireless communications system in accordance with an aspect of the disclosure.

Various aspects are disclosed in the following description and related drawings to show specific examples relating to exemplary embodiments of proximity detection between Internet of Things (IoT) devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the wired connection 109. Alternatively, or additionally, some or all of IoT devices 110-120 may be configured with a communication interface independent of air interface 108 and wired connection 109. For example, if the air interface 108 corresponds to a Wi-Fi interface, certain of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
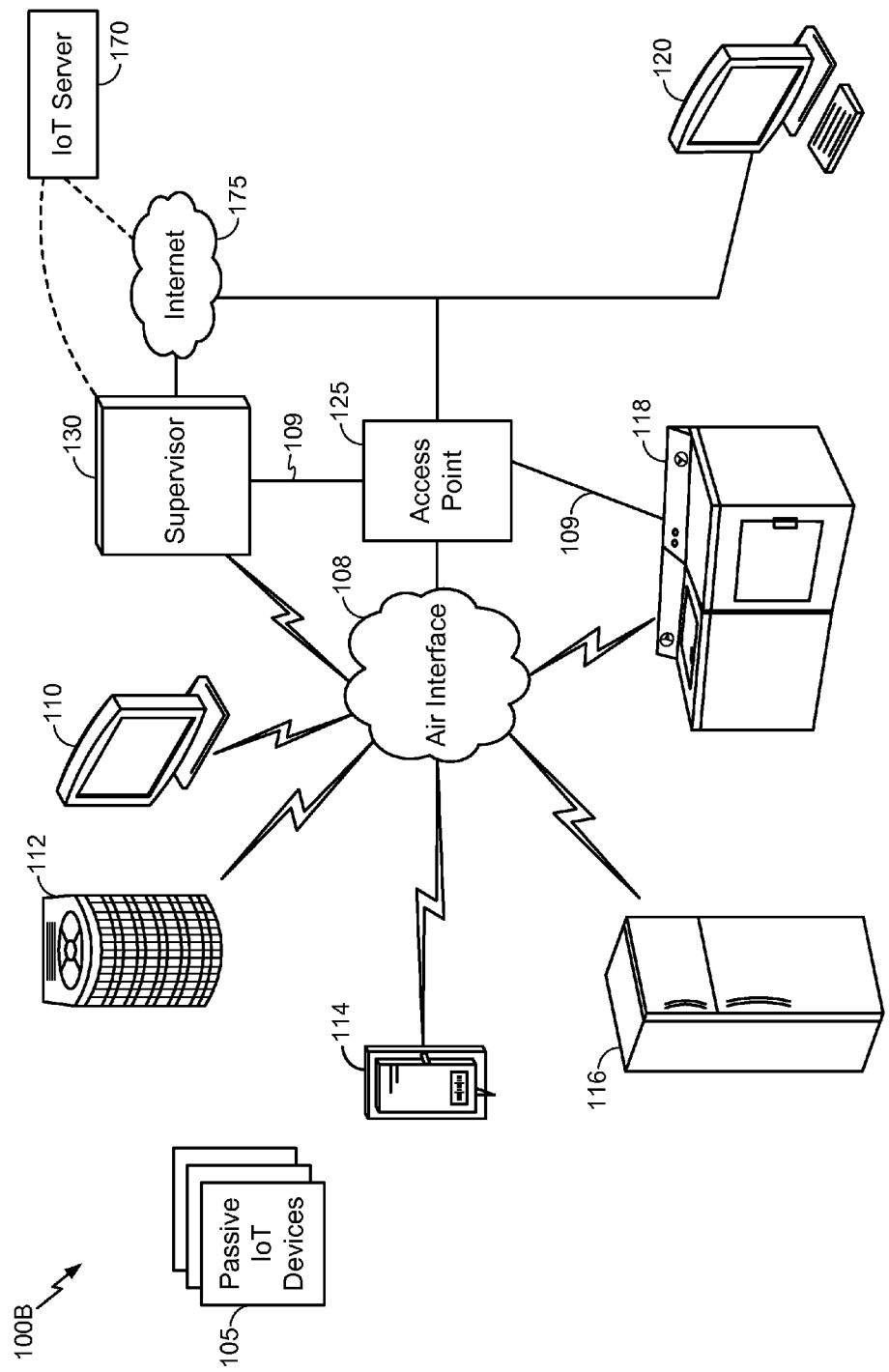
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
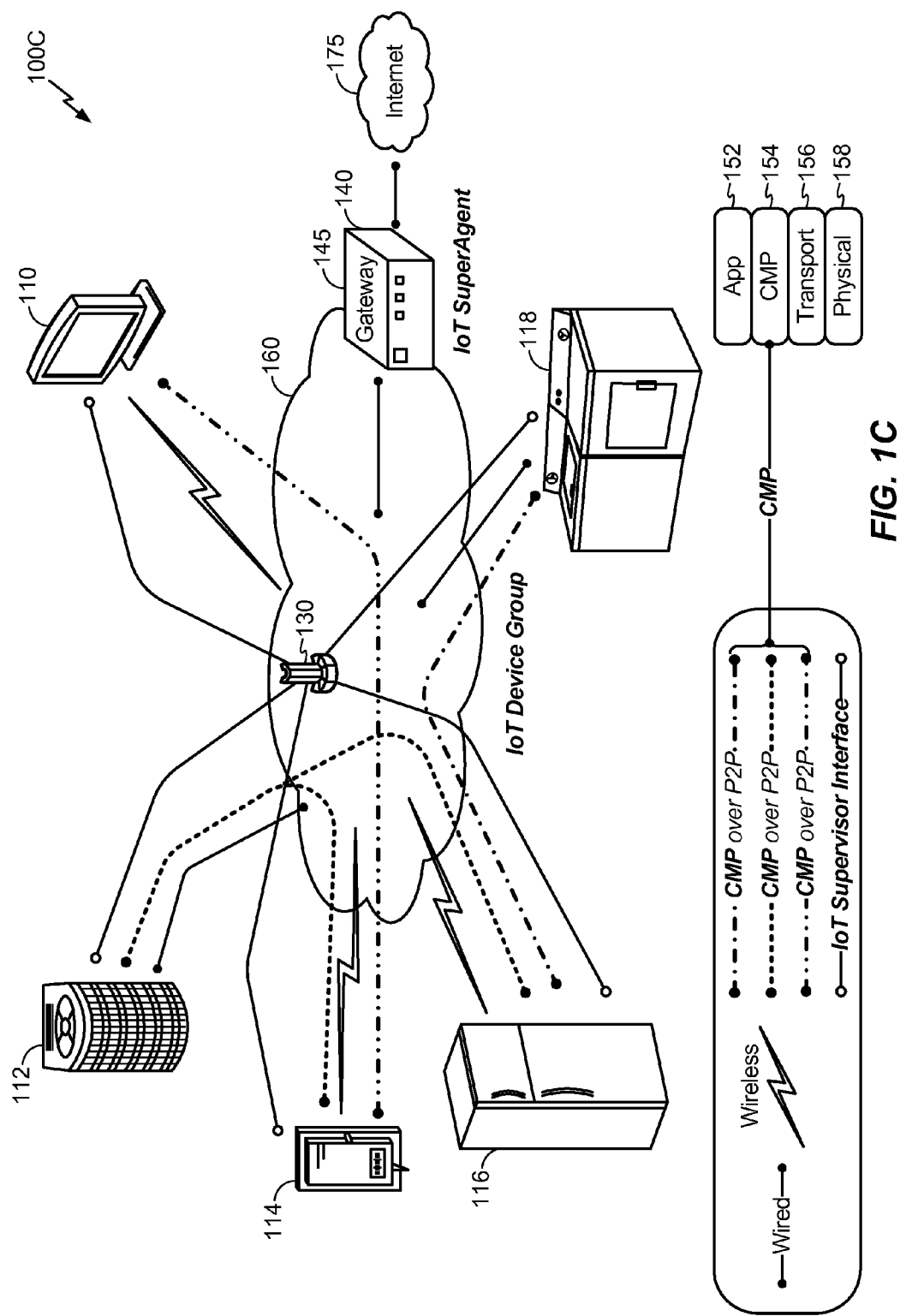
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
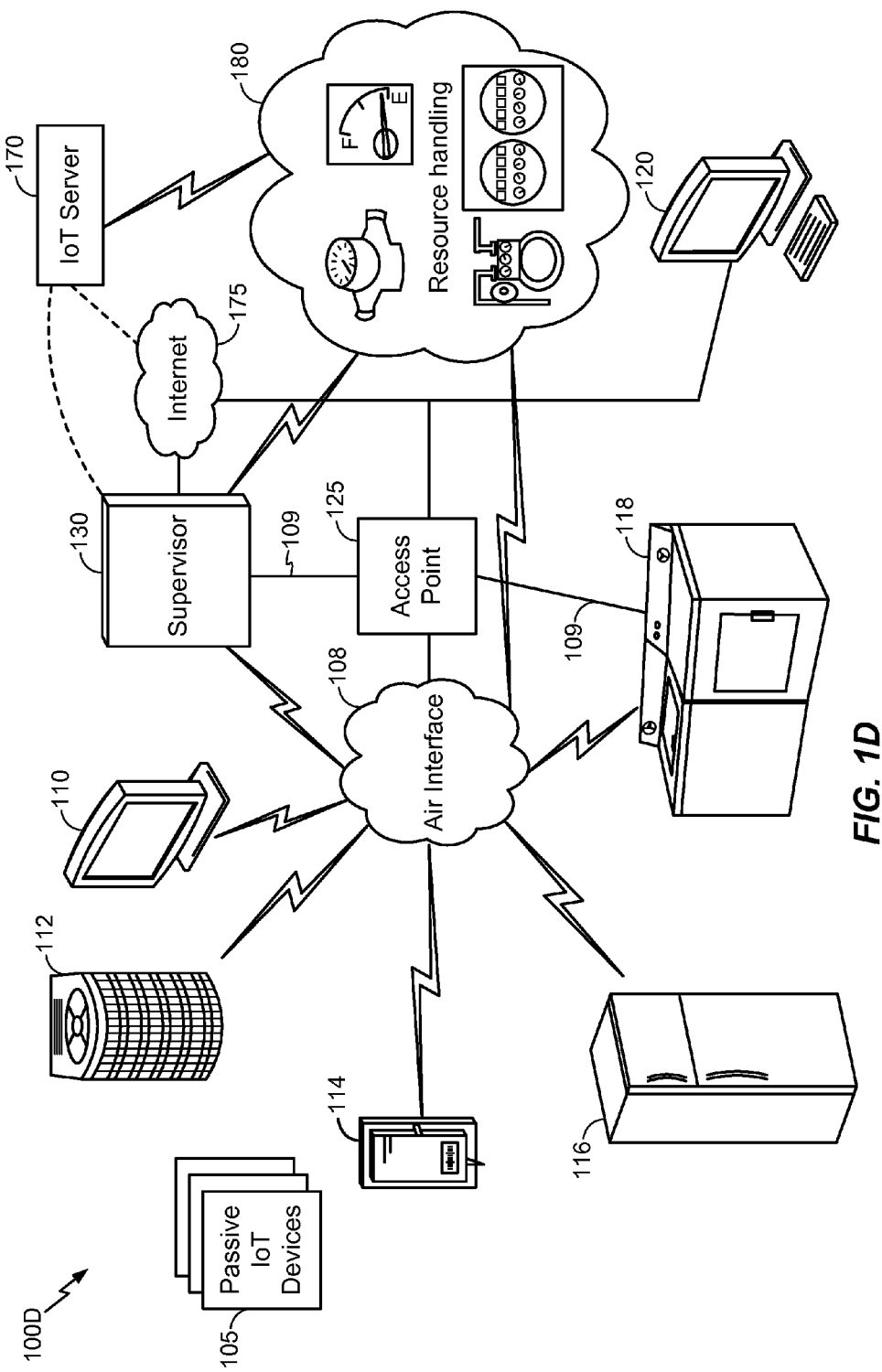
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
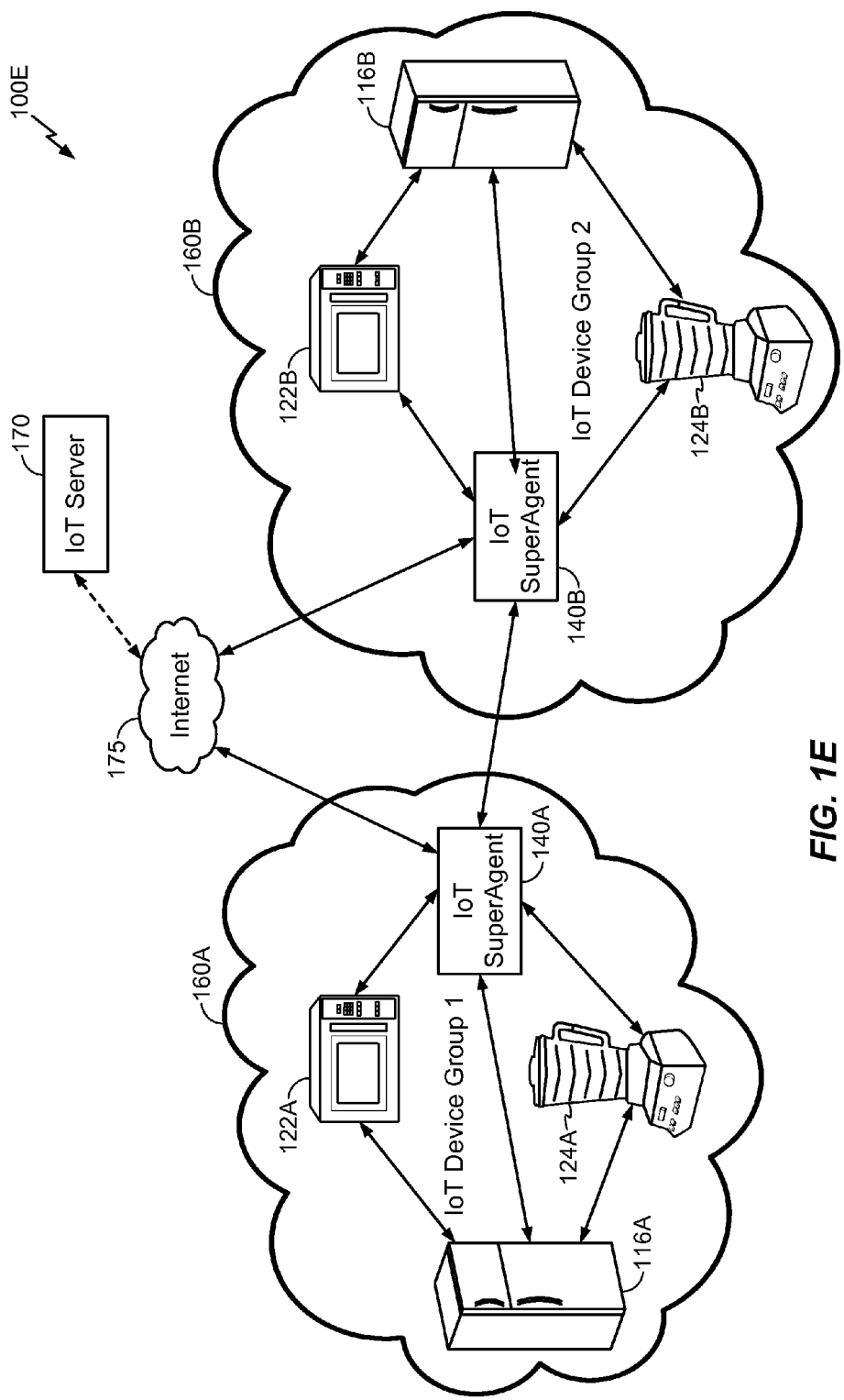
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents and 160B, those skilled in the art will appreciate that any number of IoT device groups may suitably communicate with each other using IoT Super-Agents.

Figure 2A:
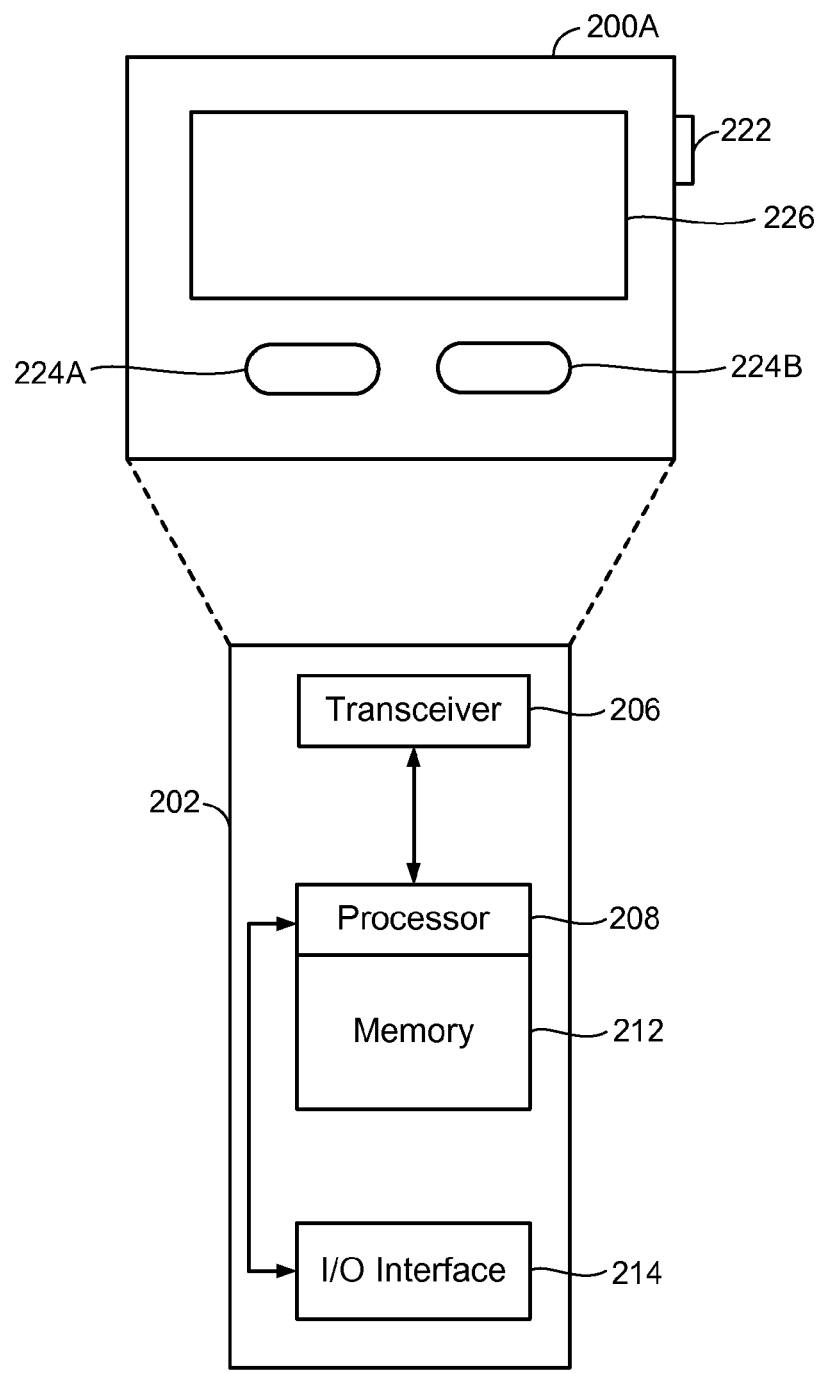

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
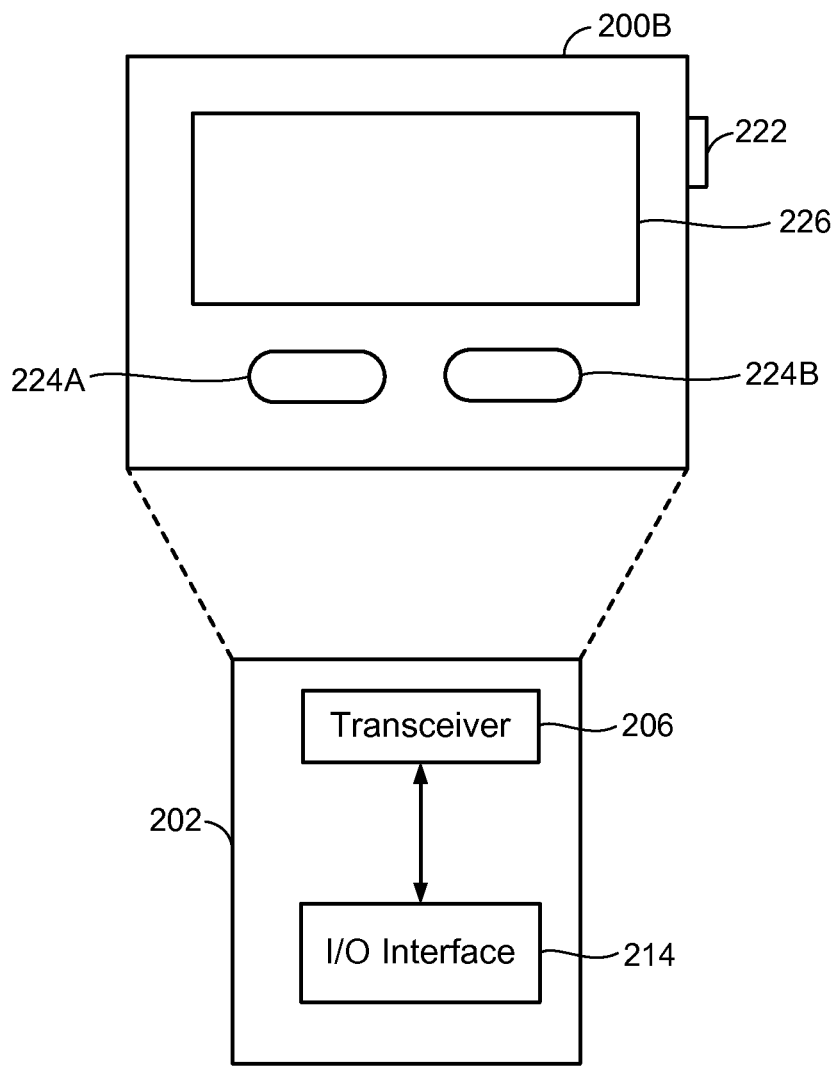
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200A may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
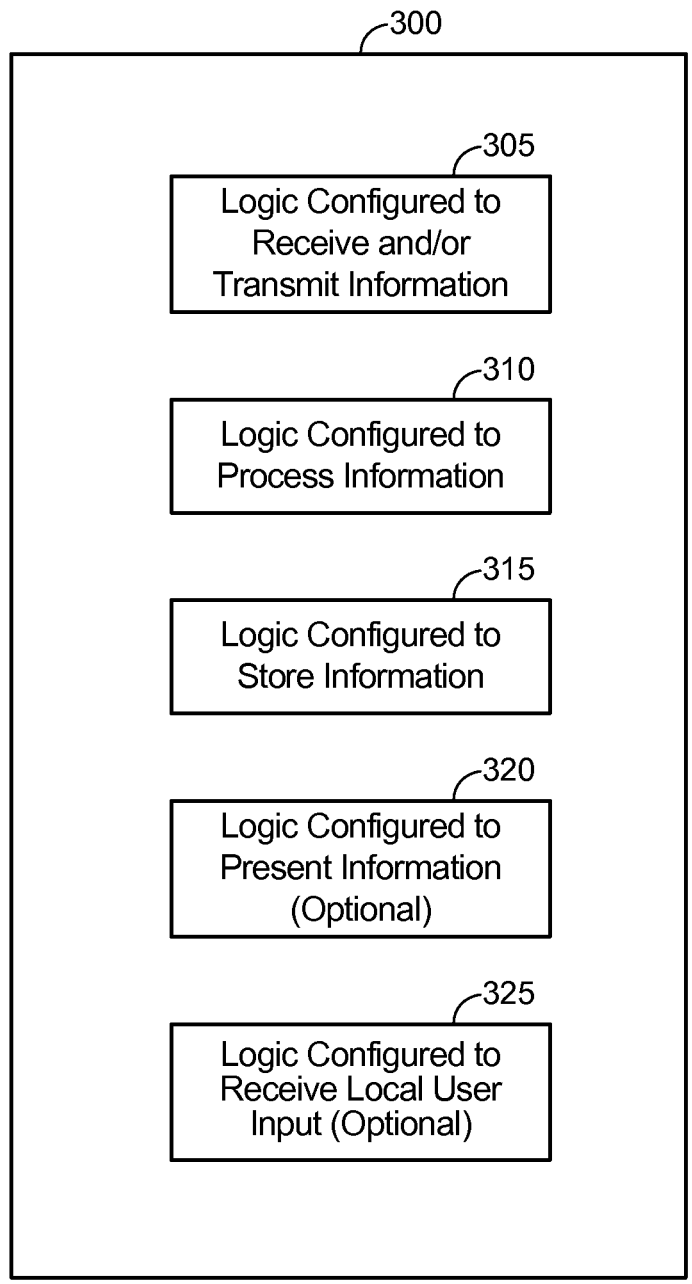
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
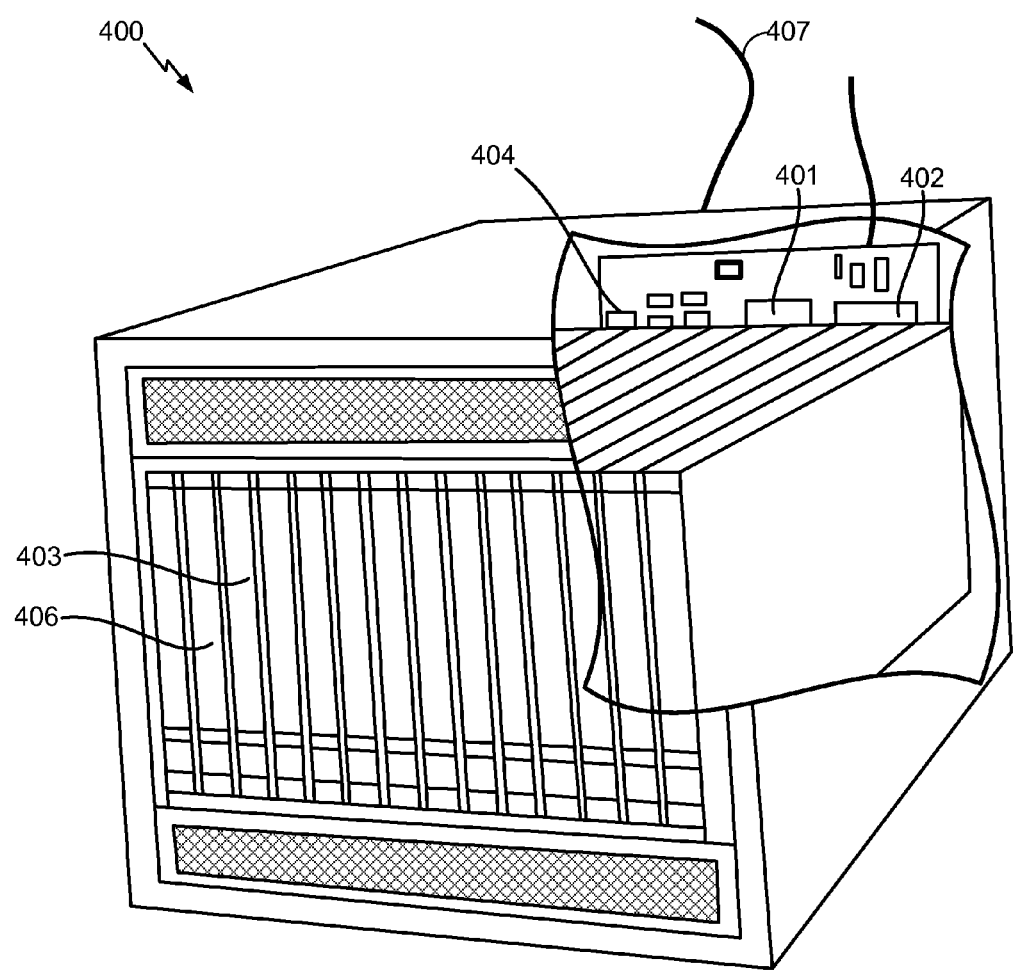
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In an IoT network or environment, enhanced functionality can obtained in certain use cases based on knowledge regarding whether two or more IoT devices are in close physical proximity to each other. As used herein, close physical proximity can correspond to IoT devices being in the same room as each other, or being a few feet away from each other in the same room, or even being a few feet away from each other in different rooms with an intervening wall between the respective IoT devices.

Figure 5:
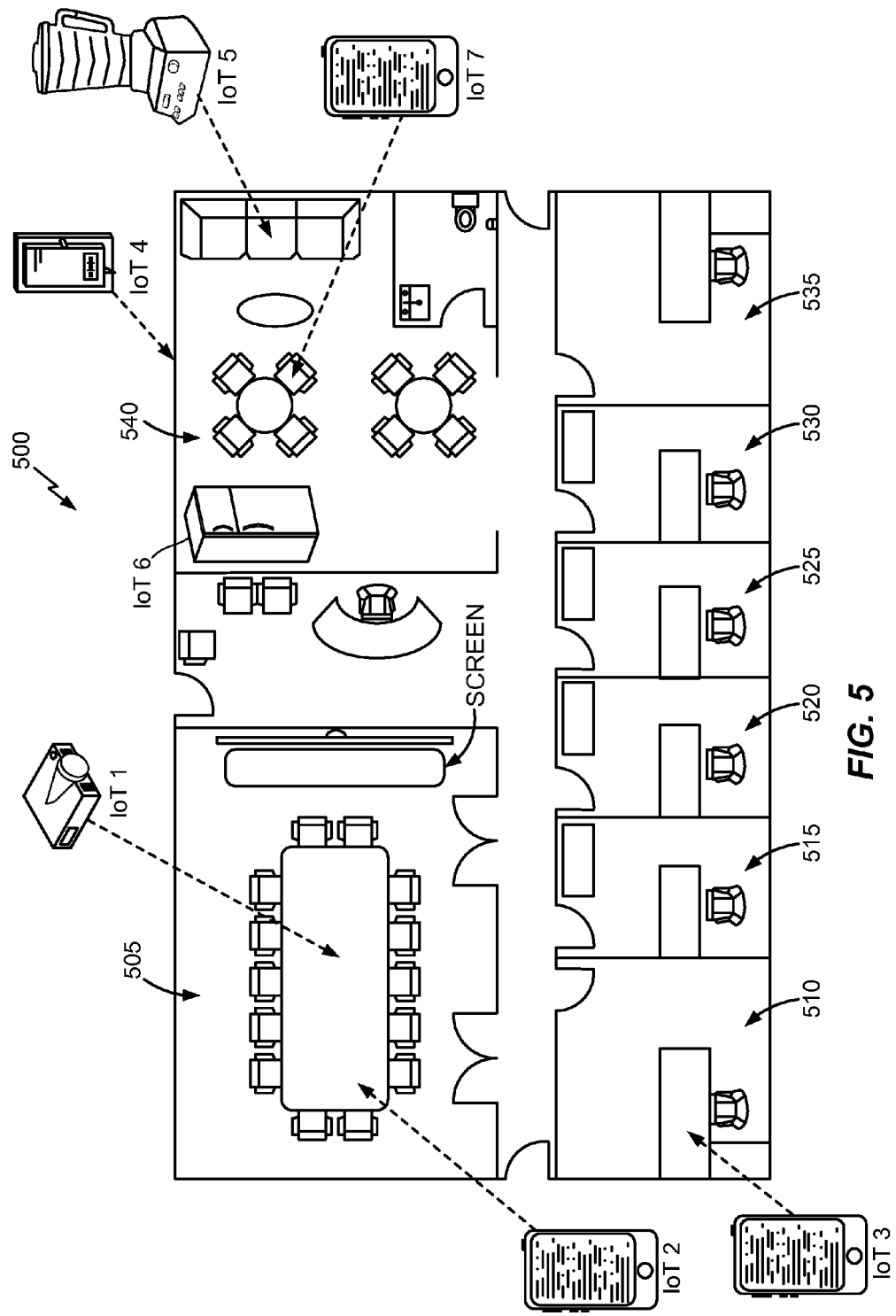
FIG. 5 illustrates an example of an IoT environment in accordance with an embodiment of the invention.

FIG. 5 illustrates an example of an IoT environment 500 in accordance with an embodiment of the invention. In FIG. 5, the IoT environment 500 is an office space with a conference room 505, a plurality of offices 510 through 535 and a kitchen 540. Within the office space, IoT device 1 (e.g., a video projector) and IoT device 2 (e.g., a handset device such as a cell phone or tablet computer) are positioned the conference room 505, and IoT device 3 (e.g., a handset device such as a cell phone or tablet computer) is positioned in office 510. Also, IoT device 4 (e.g., a thermostat), IoT device 5 (e.g., a blender), IoT device 6 (e.g., a refrigerator) and IoT device 7 (e.g., a handset device such as a cell phone or tablet computer being operated by an employee on his/her lunch break) are positioned in the kitchen 540. As will be appreciated, while the IoT environment 500 of FIG. 5 is directed to an office, many other configurations of IoT environments are also possible (e.g., residential homes, retail stores, vehicles, stadiums, etc.).

Conventionally, it is relatively difficult to determine physical proximity between IoT devices from information at the network transport layer. For example, IoT devices 4 and 5 are relatively close together in the kitchen 540, and can be connected to each other via a direct connection such as Bluetooth or via the access point 125, and their proximity (or distance from each other) can be estimated from a received signal strength indication (RSSI) or path loss estimate, but this type of metric is not very accurate for calculating proximity. NFC techniques can also be used to calculate proximity for very close IoT devices (e.g., within 20 centimeters of each other), but NFC is relatively ineffective for calculating proximity for IoT devices that are spaced further apart. Microphones provisioned on the respective IoT devices can be used to capture ambient noise for comparison, which can be helpful to ascertain whether the respective IoT devices are in the same room (or enclosed environment). However, ambient noise recognition is not necessarily a good indicator of their proximity to each other within the enclosed environment. Embodiments of the invention are thereby directed to calculating proximity between two or more IoT devices via one or more audio emissions (or "chirps") from a first IoT device that are detected at a second IoT device.

Figure 6:
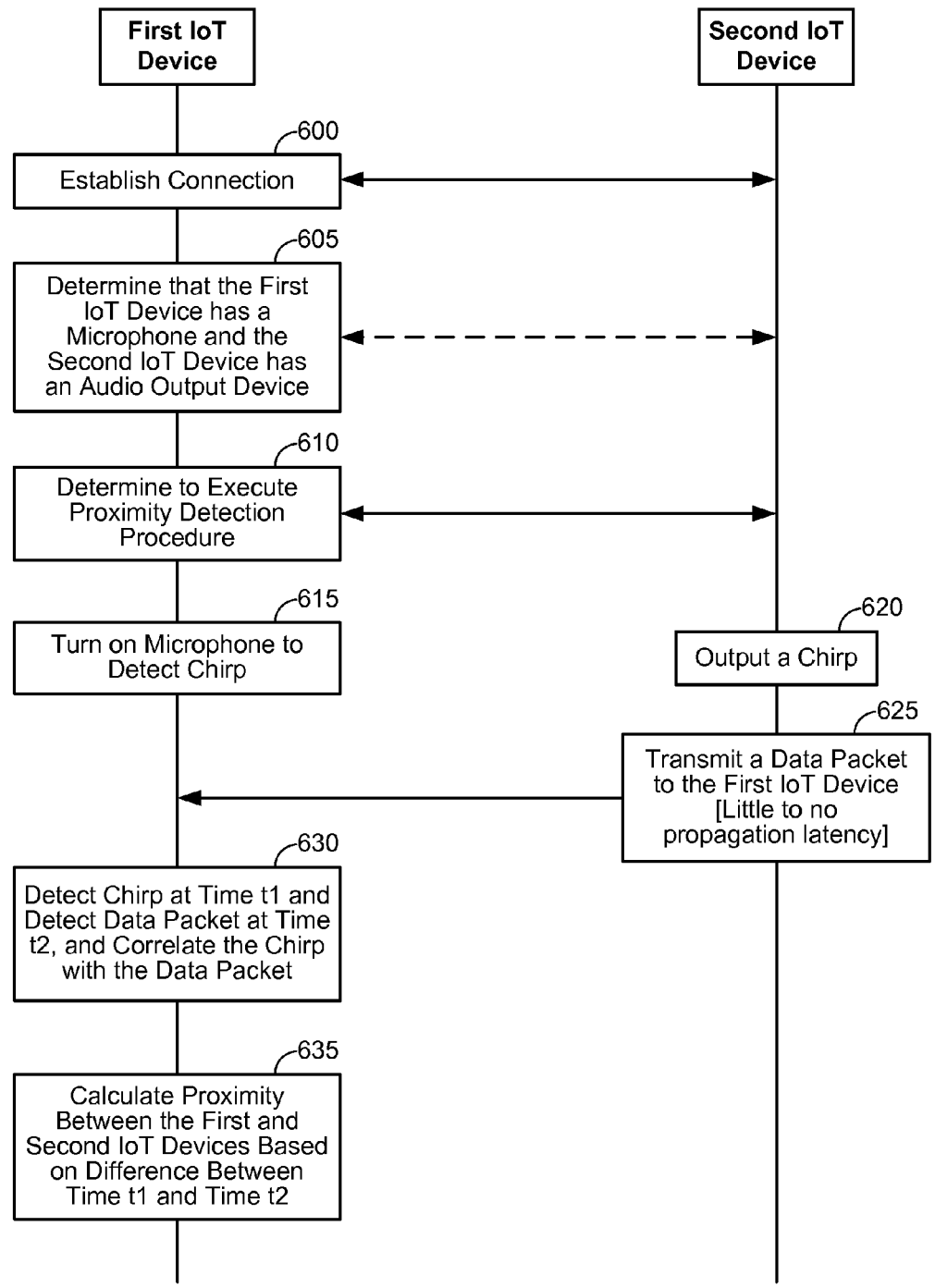
FIG. 6 illustrates a process of calculating proximity between first and second IoT devices in accordance with an embodiment of the invention.

FIG. 6 illustrates a process of calculating proximity between first and second IoT devices in accordance with an embodiment of the invention. In FIG. 6, the first IoT device and the second IoT device establish a connection, 600. The connection established at 600 can correspond to a direct connection such as Bluetooth, or alternatively to an indirect connection that is mediated by a third device (not shown) such as the access point 125 or a base station. At 605, it is determined that the first IoT device is provisioned with a microphone and the second IoT device is provisioned with an audio output device. The determination of 605 can be made at the first IoT device, the second IoT device or at both IoT devices. The determination of 605 can be made in several different ways. In an example, the first IoT device is a Smartphone with a microphone and the second IoT device is a microwave with a "beep" function. In this example, the Smartphone can identify the second IoT device as a microwave and infer that the microwave has an audio output capability (e.g., the microwave may provide its hardware serial number or model number to the Smartphone, etc.). The determination of 605 can be based upon information exchanged over the connection from 600 (e.g., the microwave reports its serial number to the Smartphone in a Bluetooth data packet) or via some other mechanism (e.g., the Smartphone may connect to the microwave via Bluetooth and may separately snap a picture of its surroundings to identify the microwave and infer its audio output capability such that the audio output capability is not inferred via data exchanged over the Bluetooth connection, etc.). Accordingly, the connection being established at 600 does not necessarily imply that subsequent operations such as the determination of 605 must use this particular connection (although this is certainly possible).

At 610, it is determined to execute a proximity detection procedure for calculating a proximity (or distance) between the first and second IoT devices. The determination of 610 can be initiated by either IoT device and then conveyed to the other IoT device. Thus, at 610, if the first IoT device determines to execute the proximity detection procedure, the first IoT device can send an instruction to initiate the procedure to the second IoT device over the connection from 600. Likewise, at 600, if the second IoT device determines to execute the proximity detection procedure, the second IoT device can send an instruction to initiate the procedure to the first IoT device over the connection from 600.

After the determination to execute the proximity detection procedure, the first IoT device turns on its microphone to monitor for a "chirp" from the second IoT device, 615. After an optional delay period to grant the first IoT device time to setup its microphone, the second IoT device outputs the chirp over a first communication path (e.g., a sound propagation medium), 620, and also transmits a data packet associated with the chirp to the first IoT device over a second communication path (e.g., a direct communication such as Bluetooth or a line-of-sight (LoS) light emission sequence, or an indirect communication path such as an IP connection via an access point), 625.

Referring to 620 of FIG. 6, in a first example, the chirp can correspond to a predetermined or preconfigured audio signature that does not require negotiation between the first and second IoT devices. For example, in the example where the first IoT device is a Smartphone and the second IoT device is a microwave, the microwave may be preconfigured with a specific type of beep to use for proximity detection procedures, and the Smartphone can be aware of the beep to be used by the microwave so that the type of chirp does not need to be negotiated between the first and second IoT devices during the proximity detection procedure. Alternatively, in a second example, the chirp can be dynamically negotiated (e.g., the second IoT device can provide a list of its available chirps and the first IoT device can approve or select one of the chirps, the first IoT device can ask for a particular chirp and the second IoT device will use that chirp if available, etc.). Further, the chirp itself can be simple or complex, depending on the audio output capability of the second IoT device. For instance, as noted above, the chirp could correspond to a simple beep if the second IoT device is a simple appliance such as a microwave, or alternatively the chirp could be a complicated waveform is the second IoT device has access to more sophisticated speakers. Also, to accommodate any users in a vicinity of the first and second IoT devices, the chirp can be modulated at a subsonic frequency (e.g., below a threshold associated with user hearing) or ultrasonic frequency (e.g., above a threshold associated with user hearing) such that the chirps are not detectable to the human ear. In yet another example, the chirp can be regulated in part based on a quality of the microphone, such that chirps that cannot be detected adequately by the microphone of the first IoT device are avoided while a chirp that are expected to be capability of adequate detection by the microphone of the first IoT device is selected for output (e.g., a chirp frequency known to be outside of a detection region for the microphone of the first IoT device is excluded from use during the proximity detection procedure, etc.).

Referring to 625 of FIG. 6, the data packet can be delivered over the connection established at 600, or alternatively over a different connection. In the embodiment of FIG. 6, it is assumed that the data packet is delivered with very little latency. For instance, the data packet can be delivered over a Bluetooth connection, over a local WiFi connection or as a sequence of line-of-sight (LoS) light emissions from the second IoT device to the first IoT device. Irrespective of how the data packet is delivered from the second IoT device to the first IoT device, the chirp and the data packet begin their respective transmissions by the second IoT device at 620 and 625 at substantially the same time (e.g., the chirp may continue being played for a brief period after the data packet has left the second IoT device but their transmission start-times are substantially the same). As used here, the chirp and the data packet beginning at "substantially the same time" means that the expected sound propagation delay of the chirp between the first and second IoT devices is expected to be high relative to any difference between the respective transmission start-times. This is to ensure that the sound propagation delay of the chirp can be used to approximate the distance between the first and second devices. For example, "substantially the same time" can be relative to a particular level of precision that is dependent upon the size of the IoT environment itself in an example (e.g., within 15 microseconds for a small IoT environment, within 2 milliseconds for a larger IoT environment, etc.).

The first IoT device detects the chirp at time t1 and detects the data packet at time t2, 630. The first IoT device then calculates its proximity to the second IoT device based on the differential between time t1 and t2, 635. For example, sound generally travels at 1 foot per millisecond (ms). Thus, under the assumption that the data packet experienced very little propagation latency, the number of milliseconds between t1 and t2 can be used as an estimate for the distance between the first and second IoT devices in feet. For example, if time t1 is 7:03:05.003 and time t2 is 7:03:05.006, the first and second IoT devices can be estimated as being approximately three (3) feet from each other. It will further be appreciated that sound travels through walls and other obstructions without much reduction to its sound propagation speed. Thereby, the above-noted calculation can be useful in estimating an absolute distance (or proximity) between two IoT devices irrespective of intervening obstructions. In conjunction with the detections of 630, the first IoT device correlates the chirp with the data packet so that the first IoT devices becomes aware that the chirp and the data packet are associated with the proximity detection procedure (e.g., based on times t1 and t2 being relatively close together, such as a few milliseconds apart from each other).

Figure 7:
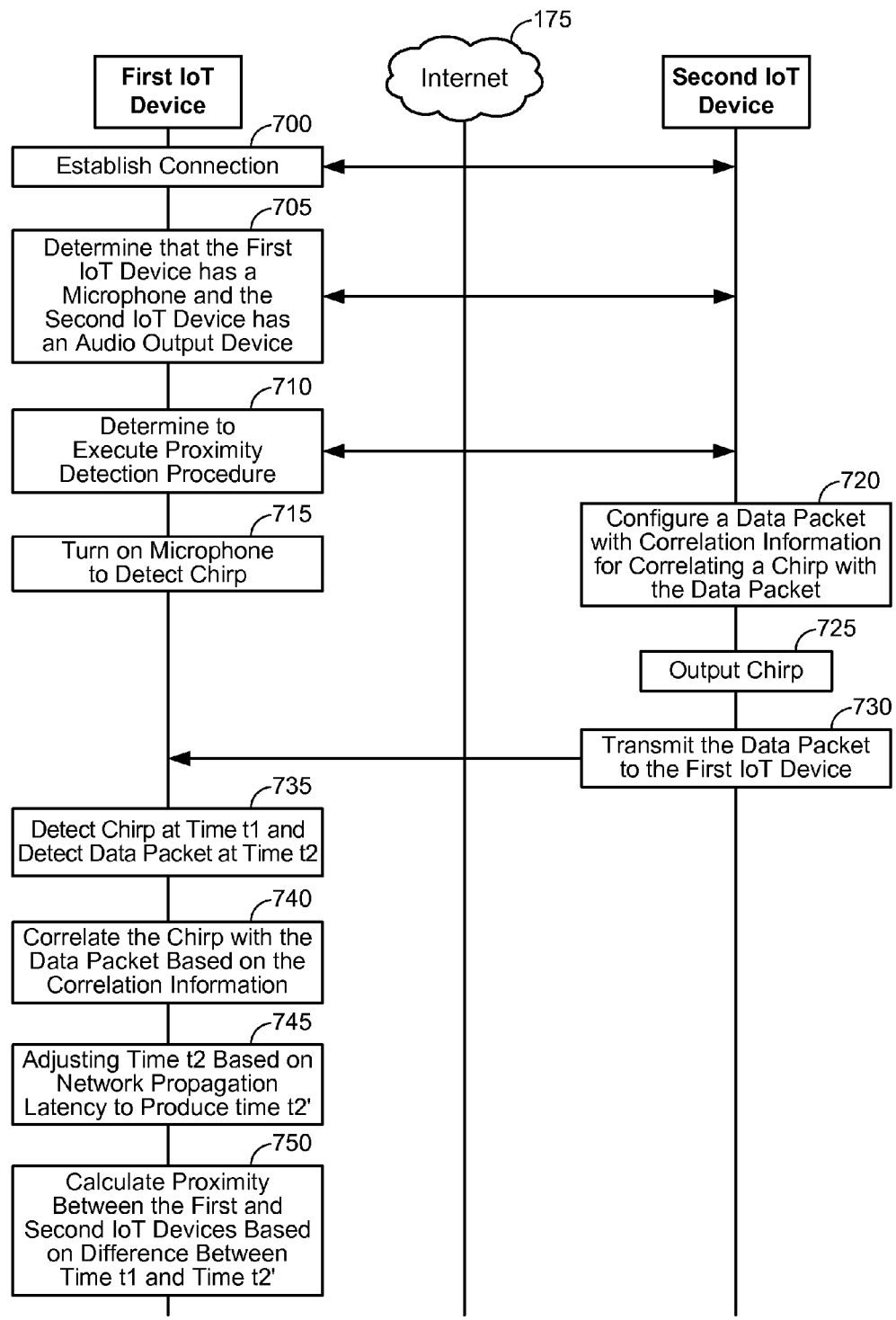
FIG. 7 is directed to a process of calculating proximity between first and second IoT devices whereby a threshold amount of network propagation delay is present and correlation information is provided via the data packet to help correlate the chirp with the data packet at the first IoT device in accordance with an embodiment of the invention.

It will be appreciated that FIG. 6 represents an embodiment that is simplified based on certain assumptions, such as the first IoT device being able to correctly associate (or correlate) the chirp detection with the data packet reception, and there being a negligible amount of propagation latency for the data packet. FIG. 7 is directed to a process of calculating proximity between first and second IoT devices whereby a threshold amount of network propagation delay is present and correlation information is provided via the data packet to help correlate the chirp with the data packet at the first IoT device in accordance with an embodiment of the invention.

Referring to FIG. 7, 700 through 715 substantially correspond to 600 through 615 of FIG. 6. However, in FIG. 7, the connection established at 700 is assumed to be mediated by the Internet 175, which causes a certain amount of network propagation latency to any data packets exchanged between the first and second IoT devices over the connection.

Referring to FIG. 7, at 720, the second IoT device configures a data packet to include correlation information for correlating a chirp to be output by the second IoT device with the data packet. In FIG. 6, the type of chirp being output by the second IoT device needed to be known to the first IoT device for the first IoT device to be capable of properly detecting the chirp and associating the detected chirp with the incoming data packet. However, in FIG. 7, the data packet itself can obtain sufficient information to permit the first IoT device to identify the chirp, such that the first IoT device does not necessarily need to know any chirp characteristics prior to the proximity detection procedure. In an example, the correlation information contained in the data packet can include a dual-tone multi-frequency (DTMF) signature that characterizes the chirp. In another example, the correlation information contained in the data packet can include a pulse-code modulation (PCM) signature that characterizes the chirp.

After configuring the data packet with the correlation information in 720 and after an optional delay period to grant the first IoT device time to setup its microphone, the second IoT device outputs the chirp and also transmits the configured data packet to the first IoT device at substantially the same time, 725 and 730 (e.g., the chirp may continue being played for a brief period after the data packet has left the second IoT device but their transmission start-times are substantially the same). In an embodiment, the second IoT device can select a transport mechanism with the lowest expected network propagation latency from a set of available transport mechanism to use for the delivery of the data packet. For example, if the first IoT device and the second IoT device are connected via an IP connection through the Internet 175, the second IoT device can select a user datagram protocol (UDP) instead of a transmission control protocol (TCP) due to UDP being a lower latency transport protocol. Of course, TCP can still be used for the delivery of the data packet in other scenarios. Also, if a direct connection such as Bluetooth were available, the direct connection would be selected due to its lower expected propagation latency.

The first IoT device detects the chirp at time t1 and detects the data packet at time t2, 735 (e.g., similar to 630 of FIG. 6). In the embodiment of FIG. 7, the first IoT device also extracts the correlation information from the received data packet to help correlate the chirp with the data packet, 740. For example, if the correlation information includes a PCM or DTMF signature, the first IoT device can compare the PCM or DTMF signature with its captured audio data to identify precisely when the chirp was detected at 735.

At 745, instead of using the time t2 as the data packet detection time without modification, the first IoT devices adjusts time t2 based on an estimation of network propagation latency to produce an adjusted detection time t2'. In an example, the estimation of the network propagation latency can be implemented in any number of ways, such as sending a separate data packet between the first and second IoT devices to determine a round-trip delay (RTD) or other latency estimation mechanisms. One particular network propagation latency estimation mechanism is described below in more detail with respect to FIG. 10. The first IoT device then calculates its proximity to the second IoT device based on the differential between time t1 and t2', 750 (instead of the differential between time t1 and time t2 as in 635 of FIG. 6).

While FIG. 7 illustrates an embodiment whereby correlation information is embedded within the data packet, it is also possible that correlation information can be embedded within the chirp instead. Thus, while the correlation information in the data packet of FIG. 7 helps the first IoT device to identify the chirp and associate the chirp with the data packet, the correlation information in the chirp of FIG. 8 helps the first IoT device to identify the data packet and associate the data packet with the chirp.

Figure 8:
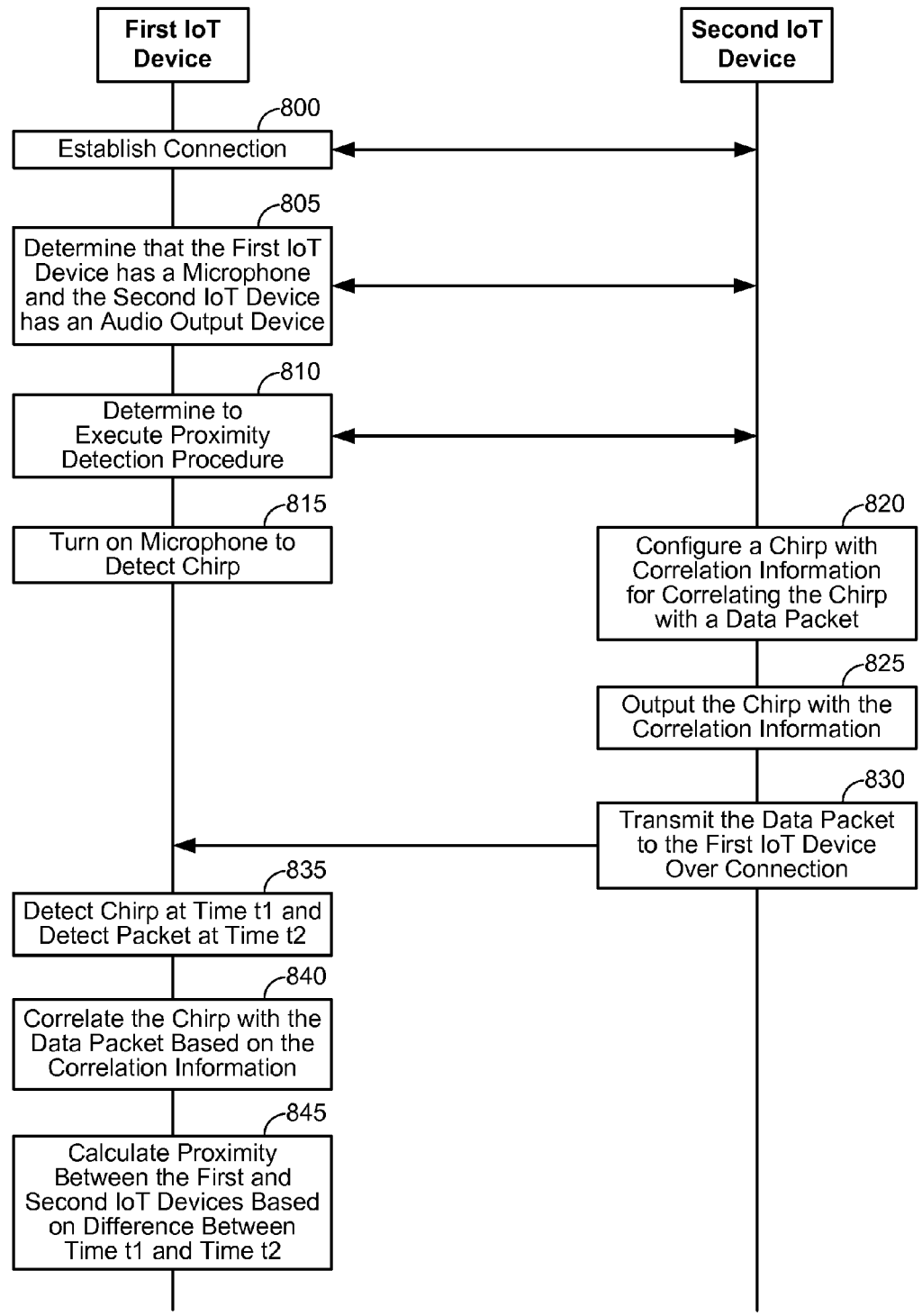
FIG. 8 is directed to a process of calculating proximity between first and second IoT devices whereby little to no network propagation delay is present and correlation information is provided via the chirp to help correlate the chirp with the data packet at the first IoT device in accordance with an embodiment of the invention.

FIG. 8 is directed to a process of calculating proximity between first and second IoT devices whereby little to no network propagation delay is present and correlation information is provided via the chirp to help correlate the chirp with the data packet at the first IoT device in accordance with an embodiment of the invention.

Referring to FIG. 8, 800 through 815 substantially correspond to 600 through 615 of FIG. 7. At 820, the second IoT device configures a chirp to include correlation information for correlating a data packet to be output by the second IoT device with the chirp. In FIG. 6, the type of chirp being output by the second IoT device needs to be known to the first IoT device for the first IoT device to be capable of properly detecting the chirp and associating the detected chirp with the incoming data packet. However, in FIG. 8, the chirp itself can obtain sufficient information to permit the first IoT device to identify the corresponding data packet. In an example, the correlation information contained in the chirp can be embedded via a watermark feature or other mechanism for overlaying information onto an audio signal. In a further example, the correlation information can include a sequence number of the corresponding data packet, such that the first IoT device can compare the sequence number from the chirp with a sequence number in a header of the data packet to verify the data packet that is received in association with the proximity detection procedure.

After configuring the chirp with the correlation information in 820 and after an optional delay period to grant the first IoT device time to setup its microphone, the second IoT device outputs the configured chirp and also transmits the data packet to the first IoT device at substantially the same time, 825 and 830 (e.g., the chirp may continue being played for a brief period after the data packet has left the second IoT device but their transmission start-times are substantially the same). In the embodiment of FIG. 8, the data packet is assumed to be delivered with little to no propagation latency (e.g., no more than one or two milliseconds, etc.), such as via a direct Bluetooth connection, a sequence of light signals and so on.

The first IoT device detects the chirp at time t1 and detects the data packet at time t2, 835 (e.g., similar to 630 of FIG. 6). In the embodiment of FIG. 8, the first IoT device also extracts the correlation information from the detected chirp to help correlate the chirp with the data packet, 840. For example, if the correlation information includes a sequence number, the first IoT device can compare the sequence number from the chirp signature with a sequence number form the header of the data packet to verify that that particular data packet is the data packet associated with the chirp in conjunction with the proximity detection procedure. The first IoT device then calculates its proximity to the second IoT device based on the differential between time t1 and t2, 845 (e.g., similar to 635 of FIG. 6).

While FIGS. 7-8 illustrate examples whereby correlation information is contained in either the data packet (e.g., FIG. 7) or the chirp (e.g., FIG. 8), it is also possible that correlation information is contained in both the data packet and the chirp. This way, if the chirp is detected first, the correlation information in the chirp can be used to help detect the data packet, and if the data packet is detected first, the correlation information in the data packet can be used to help detect the chirp.

Figure 9:
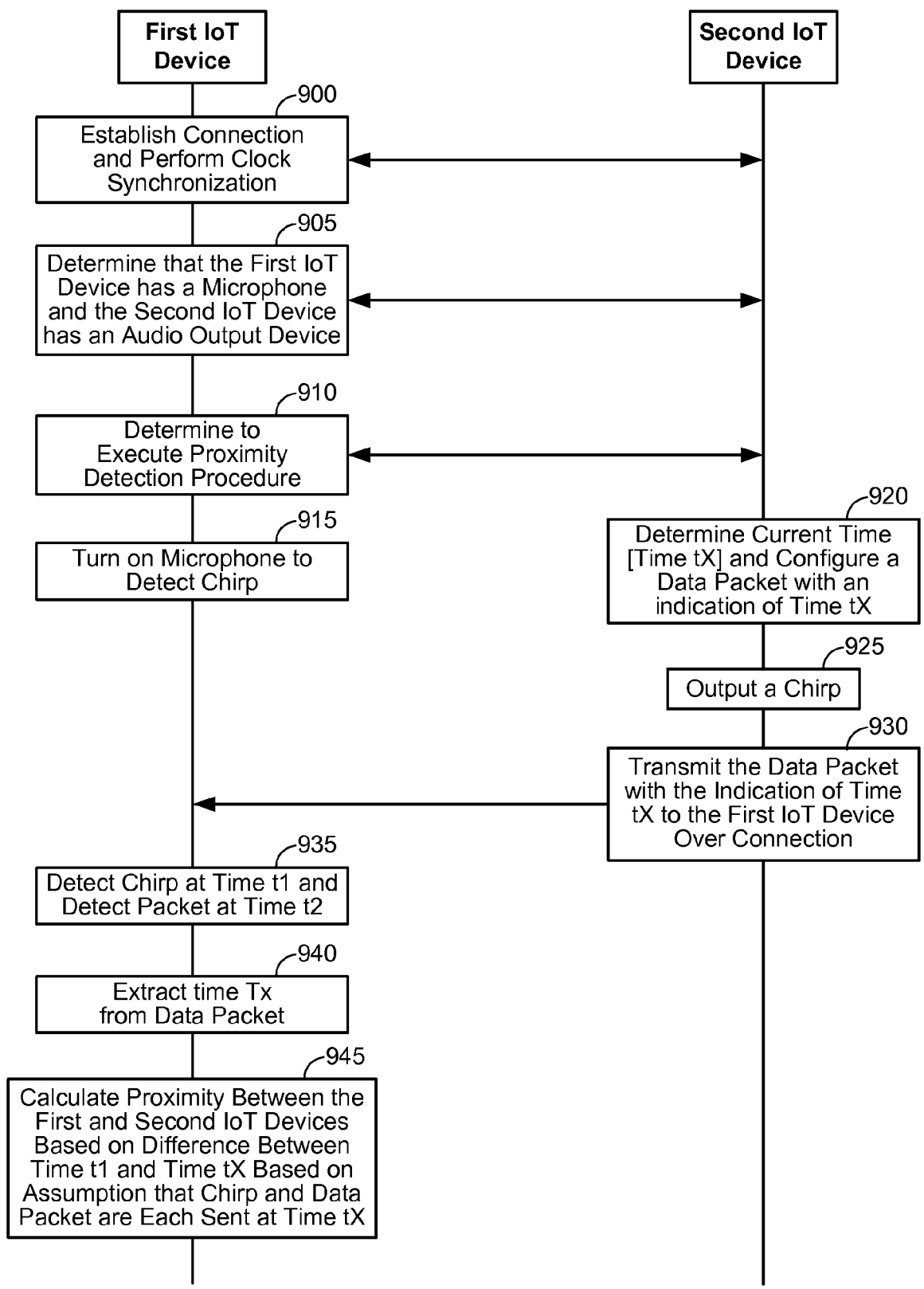
FIG. 9 is directed to a process of calculating proximity between first and second IoT devices where clock synchronization between the first and second IoT devices is present in accordance with an embodiment of the invention.

The embodiments described above with respect to FIGS. 6 through 8 are configured for implementation irrespective of whether clock synchronization is possible between the first and second IoT devices. For example, the clock on an IoT coffeemaker device is usually not synchronized with a nearby IoT Smartphone device at all, let alone to a millisecond level of precision. However, it is possible for some IoT devices to have their clocks synchronized with each other in some scenarios. With this in mind, FIG. 9 is directed to an implementation specifically where clock synchronization is present at this level of precision. More specifically, FIG. 9 is directed to a process of calculating proximity between first and second IoT devices where clock synchronization between the first and second IoT devices is present in accordance with an embodiment of the invention. In FIG. 9, network propagation latency associated with the delivery mechanism for the data packet is not relevant due to the clock synchronization, as will be described below in more detail.

Referring to FIG. 9, 900 through 915 substantially correspond to 900 through 915 of FIG. 6. At 920, after an optional delay period to grant the first IoT device time to setup its microphone, the second IoT device configures a data packet to include a current time e.g., 9:36:04.001), referred to as "time tX", at a level of precision that is accurate at least to within a few milliseconds (e.g., 4 milliseconds, 0.5 milliseconds, etc.). The level of precision can be based on a degree which the clock synchronization between the first and second IoT devices is accurate (e.g., if the two clocks are synchronized to within two milliseconds of errors, then time tX can be accurate to within two milliseconds, etc.).

After configuring the data packet with time tX in 920, the second IoT device outputs the chirp substantially at time tX, 925, and also transmits the configured data packet to the first IoT device, 925 and 930. Unlike FIGS. 6-8, the transmission start times for the chirp and the data packet do not necessarily need to be aligned in FIG. 9 because the data packet contains the indication of time tX. In other words, the first IoT device will use tX as the presumed transmission start-point of the chirp, so even if the data packet itself is not sent precisely at time tX, time tX is still useful for approximating the distance between the first and second IoT devices based on the sound propagation speed of the chirp.

The first IoT device detects the chirp at time t1, 935, and detects the data packet at time t2, 940 (e.g., similar to 630 of FIG. 6). In the embodiment of FIG. 9, the first IoT device also extracts tX from the received data packet, 940. The first IoT device then calculates its proximity to the second IoT device based on the differential between time t1 and tX, 945 (instead of the differential between time t1 and time t2 as in 635 of FIG. 6). As will be appreciated, the time differential between time t1 and time tX is substantially equal to the propagation time for the chirp, which can be used to infer the distance between the first and second IoT devices.

As an alternative to FIG. 9, the chirp itself could be embedded with time tX instead of the data packet. In this case, the data packet could be omitted altogether, and the first IoT device could calculate the proximity between the first and second IoT devices based solely upon on a differential between the reception time t1 of the chirp and time tX as indicated in the chirp.

Figure 10:
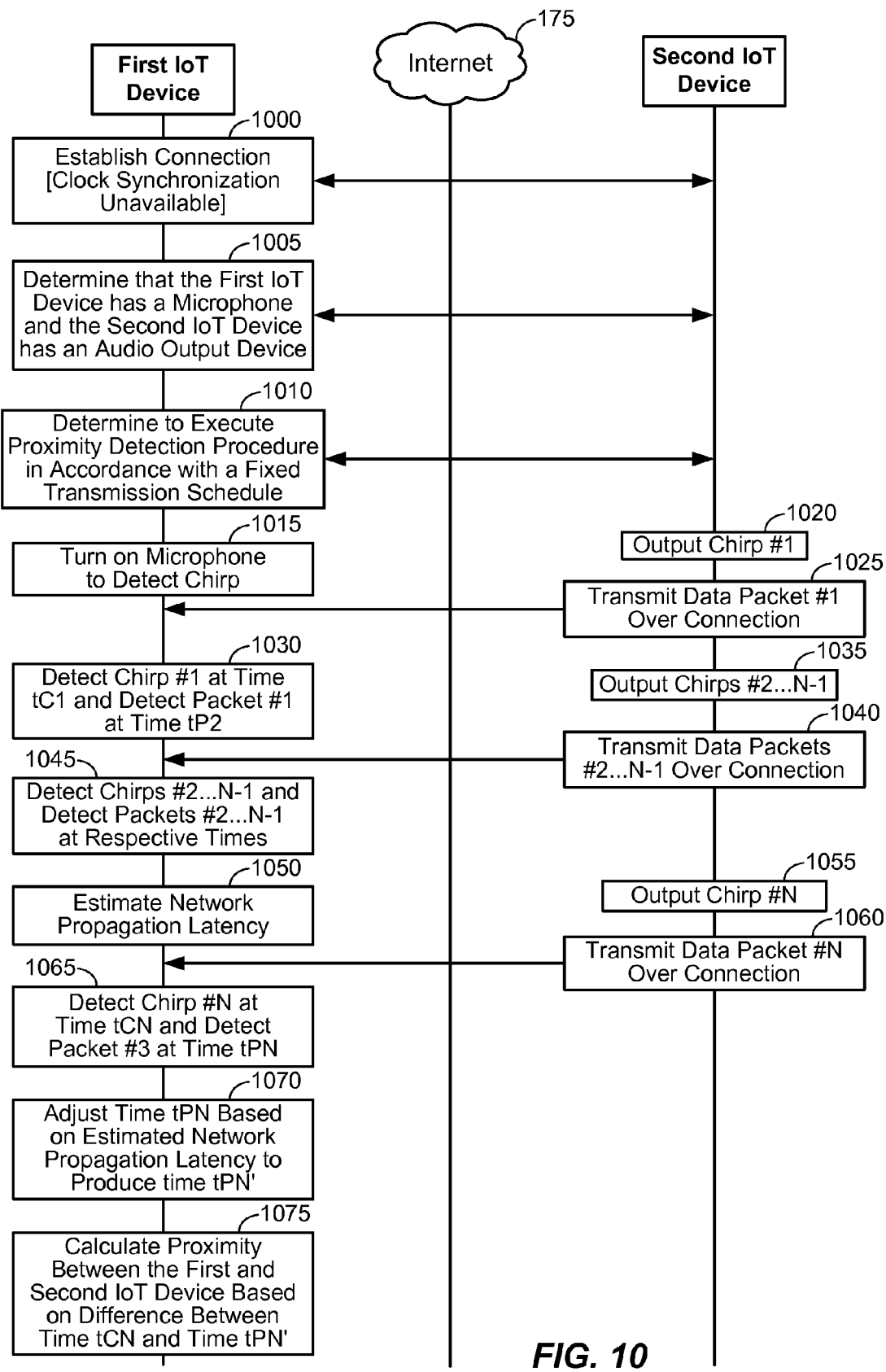
FIG. 10 is directed to a process of calculating proximity between first and second IoT devices whereby a threshold amount of network propagation delay is present and clock synchronization is unavailable in accordance with an embodiment of the invention.

FIG. 10 is directed to a process of calculating proximity between first and second IoT devices whereby a threshold amount of network propagation delay is present and clock synchronization is unavailable in accordance with an embodiment of the invention.

Referring to FIG. 10, 1000 through 1005 substantially correspond to 600 through 605 of FIG. 6. However, in FIG. 10, the connection established at 1000 is assumed to be mediated by the Internet 175, which causes a certain amount of network propagation latency to any data packets exchanged between the first and second IoT devices over the connection. Further, unlike FIG. 7 where the network propagation latency was assumed to already be known to the first IoT device, FIG. 10 is directed to dynamically calculating the network propagation latency via a latency discovery scheme.

Referring to FIG. 10, at 1010, it is determined to implement the proximity detection procedure in accordance with a fixed transmission schedule (as opposed to a single transmission of a chirp and a data packet as in FIGS. 6-9). The first IoT device turns on its microphone at 1015. Then, once the first and second IoT devices are both notified of the fixed transmission schedule, the second IoT device begins to transmit a sequence of chirps with corresponding data packets at an interval defined by the fixed transmission schedule.

Accordingly, the second IoT device outputs a first chirp ("chirp 1") and transmits a first data packet ("data packet 1") at a first transmission time ("transmission time 1") as defined by the fixed transmission schedule, 1020 and 1025. The first IoT device detects chirp 1 at time tC1 and detects data packet 1 at time tP2, 1030. The second IoT device next outputs a chirps 2 . . . N−1 along with respective data packets 2 . . . N−1 at transmission times 2 . . . N−1 as defined by the fixed transmission schedule, 1035 and 1040. The first IoT device detects chirps 2 . . . N−1 at times tC2 . . . tCN−1, respectively, and data packets 2 . . . N−1 at times tP2 . . . tPN−1, respectively, 1045. Under the assumption that the network propagation latency is relatively constant, the first IoT device can compute the network propagation latency as an average of the differences between the arrival time of one of the data packets and an arrival time of the next chirp. Thus, the differences between tP1 and tC2, tP2 and tC3, . . . , tPN−2 and tCN−1 can be calculated and then averaged together to estimate the network propagation latency, 1050. After estimating the network propagation latency at 1050, 1055 through 1075 substantially correspond to 725 through 750 for a subsequent transmission of chirp N and data packet N, which arrive at the first IoT devices at times tCN and tPN, respectively, whereby tPN is adjusted based on the estimated network propagation latency to produce tPN' which is used to calculate the proximity (e.g., based on a difference between tPN' and tCN).

Figure 11:
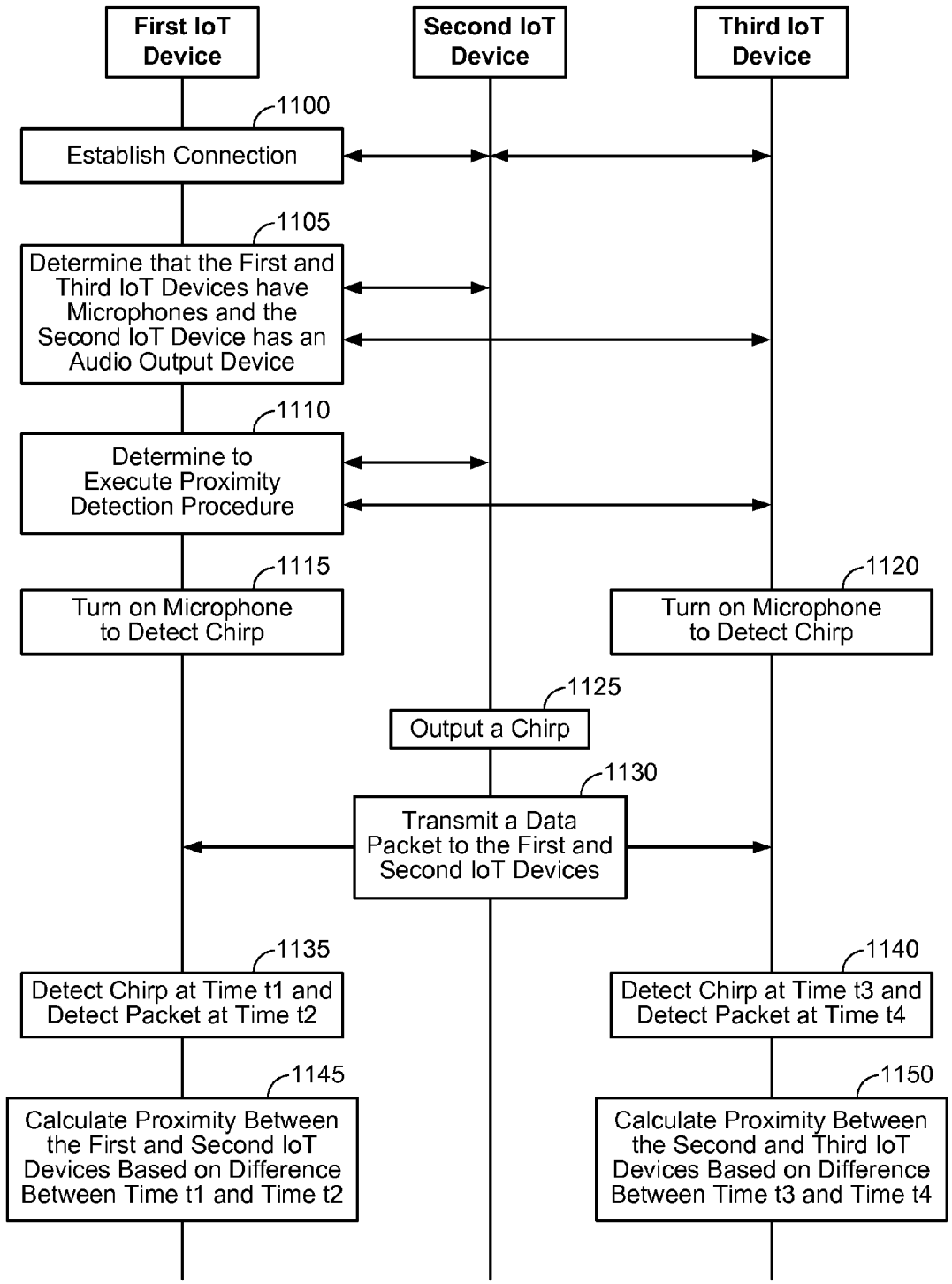
FIG. 11 is directed to a process whereby multiple IoT devices with microphones can calculate their distance to a chirping IoT device via a single proximity detection procedure in accordance with an embodiment of the present invention.
Figure 12:
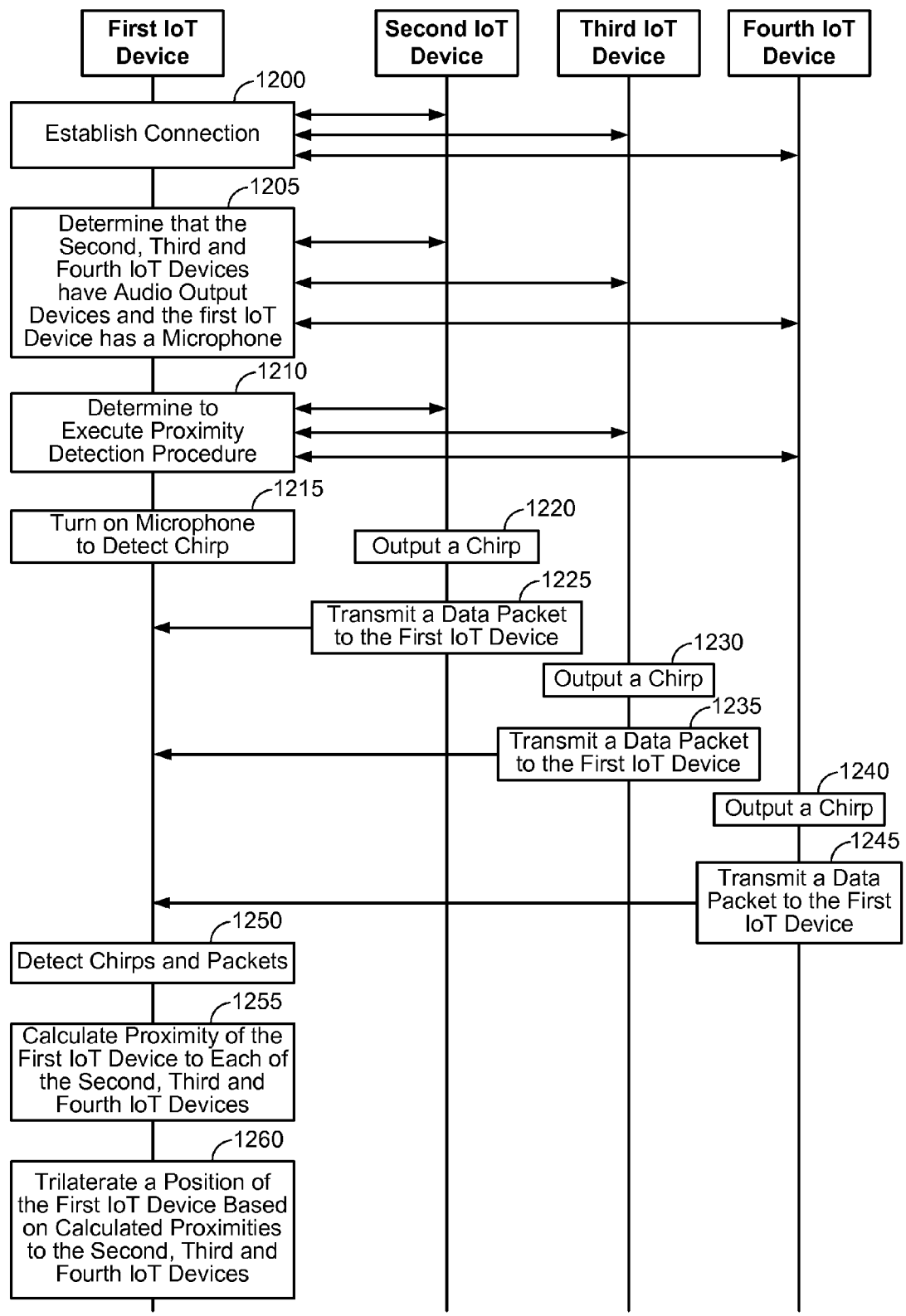
FIG. 12 is directed to a process whereby an IoT device with a microphone computes its relative location to a plurality of other chirping devices via trilateration in accordance with an embodiment of the present invention.

While the embodiments of FIGS. 6-10 relate to two IoT devices determining their proximity to each other, it is possible to extend these teachings to an implementation whereby multiple IoT devices with microphones can calculate their location to a "chirping" IoT device via a single proximity detection procedure (e.g., as described below with respect to FIG. 11), and also to an implementation whereby a single IoT device with a microphone can compute its relative location to a plurality of other chirping devices via trilateration (e.g., as described below with respect to FIG. 12).

Referring to FIG. 11, first, second and third IoT devices establish connections each other, 1100. The connections established at 1100 can be the same or different. For example, the first IoT device can be connected to the second IoT device via a first Bluetooth connection and the first IoT device can be connected to the third IoT device via a second Bluetooth connection. In another example, the first IoT device can be connected to the second IoT device via the access point 125 and the second IoT device can be connected to the third IoT device via a Bluetooth connection. In another example, the first IoT device can be connected to the second IoT device via a Bluetooth connection and the first IoT device can be connected to the third IoT device via a hop to the second IoT device, such that the first and third IoT devices are not directly connected.

At 1105, it is determined that the first and third IoT devices are provisioned with microphones and the second IoT device is provisioned with an audio output device. The determination of 1105 can be made at any (or all) of the first through third IoT devices, similar to 605 of FIG. 6. At 1110, it is determined to execute a proximity detection procedure for calculating a proximity (or distance) (i) between the first and second IoT devices and also (ii) between the second and third IoT devices. The determination of 1110 can be made by any of the first through third IoT devices, similar to 610 of FIG. 6.

After the determination to execute the proximity detection procedure, the first and third IoT devices turn on their microphones to monitor for a "chirp" from the second IoT device, 1115 and 1120. After an optional delay period to grant the first and third IoT devices time to setup their respective microphones, the second IoT device outputs the chirp, 1125, and also transmits a data packet associated with the chirp to both the first and third IoT devices, 1130. Thus, 1125 is similar to 620 of FIG. 6 insofar as a single chirp is output by the second IoT device, while the data packet transmission of 1130 is somewhat different than 625 of FIG. 6 because two separate data packets are transmitted to the first and third IoT devices. The data packet transmissions at 1130 can either occur over the same transport mechanism (e.g., UDP, Bluetooth, a light sequence, etc.) or different transport mechanisms.

The first IoT device detects the chirp at time t1 and detects its data packet at time t2, 1135 (e.g., similar to 630 of FIG. 6), and the third IoT device detects the chirp at time t3 and detects its data packet at time t4, 1140 (e.g., similar to 630 of FIG. 6). The first IoT device then calculates its proximity to the second IoT device based on the differential between time t1 and t2, 1145 (e.g., similar to 635 of FIG. 6), and the third IoT device also calculates its proximity to the second IoT device based on the differential between time t3 and t4, 1150 (e.g., similar to 635 of FIG. 6).

Turning to FIG. 12, the first IoT device establishes connections with a second IoT device, a third IoT device and a fourth IoT device, 1200. The connections established at 1200 can be the same or different. For example, the first IoT device can be connected to the second IoT device via a first Bluetooth connection, the first IoT device can be connected to the third IoT device via a second Bluetooth connection and the first IoT device can be connected to the fourth IoT device through the Internet 175 via the access point 125. In another example, the first IoT device can be connected to the second IoT device via a Bluetooth connection and the first IoT device can be connected to the third and fourth IoT devices via hopping to the second IoT device, such that the first IoT device is not directly connected to the third or fourth IoT device.

At 1205, it is determined that the first IoT device is provisioned with a microphone and that the second, third and fourth IoT devices are each provisioned with an audio output device. The determination of 1205 can be made at any of the first through fourth IoT devices, similar to 605 of FIG. 6. At 1210, it is determined to execute a proximity detection procedure for calculating a proximity (or distance) between the first IoT device and each of the second, third and fourth IoT devices. The determination of 1210 can be made by any of the first through fourth IoT devices, similar to 610 of FIG. 6.

After the determination to execute the proximity detection procedure, the first IoT device turn on its microphones to monitor for a "chirp" from the second, third and fourth IoT devices, 1215. In an example, the first IoT device can distinguish between the chirps from the second, third and fourth IoT devices based on time (e.g., the proximity detection procedures can be performed in a serially or consecutively to avoid chirp confusion), or alternatively via a unique chirp being transmitted from each of the second, third and fourth IoT devices (e.g., such that the timing of their arrival at the first IoT device is less relevant to chirp-to-device correlation).

After an optional delay period to grant the first IoT device time to setup its microphone, the second IoT device outputs its chirp, 1220, and also transmits a data packet associated with its chirp to the first IoT device, 1225. Similarly, after an optional delay period to grant the first IoT device time to setup its microphone, the third IoT device outputs its chirp, 1230, and also transmits a data packet associated with its chirp to the first IoT device, 1235. Similarly, after an optional delay period to grant the first IoT device time to setup its microphone, the fourth IoT device outputs its chirp, 1240, and also transmits a data packet associated with its chirp to the first IoT device, 1245. The data packet transmissions at 1225, 1235 and/or 1245 can either occur over the same transport mechanism (e.g., UDP, Bluetooth, a light sequence, etc.) or different transport mechanisms.

The first IoT device detects the chirps and data packets from each of the second, third and fourth IoT devices at respective times, 1250. In particular, the chirp and data packet from the second IoT device are detected at times t1 and t2, respectively, the chirp and data packet from the third IoT device are detected at times t3 and t4, respectively, and the chirp and data packet from the fourth IoT device are detected at times t5 and t6, respectively. The first IoT device then calculates its proximity to the second IoT device based on the differential between time t1 and t2, the third IoT device based on the differential between time t3 and t4 and the fourth IoT device based on the differential between time t5 and t6, 1255 (e.g., similar to 635 of FIG. 6).

After the first IoT device obtains its proximity the second, third and fourth IoT devices, the first IoT device trilaterates its relative position, 1260. As will be appreciated, if the absolute coordinates of the second, third or fourth IoT devices are also known, the first IoT device can further calculate its own coordinate from these three data points. Accordingly, well known geometric techniques such as trilateration can be used to determine the absolute location of a mobile device within a particular space.

While different embodiments are used to emphasize different aspects, it will be appreciated that these aspects can interchangeably be used in different of the embodiments in various permutations. For example, FIGS. 11 and 12 are described without reference to network propagation latency, and it is understood that network propagation latency can be estimated and adjusted for as described above with respect to FIGS. 7 and/or 10. Likewise, the data packet and/or chirp can be configured with correlation information as described above with respect to FIGS. 8 and 9, respectively, in any of the other embodiments as well. Likewise, whenever clock synchronization exists between any two IoT devices, the procedure described above with respect to FIG. 9 can be used so that time tX is conveyed to the IoT device with the microphone, and so on.

Further, while the IoT device provisioned with the microphone corresponds to the entity that performs the proximity calculation in the embodiments described above, it will be readily appreciated that any device that obtains the relevant time points can perform this calculation. Thus, in context with FIG. 6, the first IoT device could forward times t1 and t2 back to the second IoT device so that the second IoT device can perform the proximity calculation, the first IoT device could forward times t1 and t2 to the IoT server 170 so that the IoT server 170 can perform the proximity calculation, and so on. Similarly, the results of the proximity calculations can be used in variety of manners, and can be forwarded on to any relevant device (e.g., the first IoT device can notify the second IoT device of their proximity after calculation, or vice versa). Further, once calculated, the proximity can be used as an input into decision logic that executes intelligent decisions (e.g., if a user's cell phone is close to his/her coffee machine when the coffee is ready, the coffee machine can emit a sound as normal, but if the user's cell phone is not close to his/her coffee machine such that the user is expected to be out of range of the coffee machine's normal beep notification, the coffee machine can instead deliver an alert via SMS to ensure that the user is aware that his/her coffee is ready, etc.).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first Internet of Things (IoT) device that is configured to determine a proximity to a second IoT device, comprising:
    establishing a connection with the second IoT device;
    determining to execute a proximity detection procedure with the second IoT device;
    monitoring, via a microphone coupled to the first IoT device, for an audio emission over a first communication path from the second IoT device in response to the determination;
    receiving, at a first time point, a data packet that is transmitted by the second IoT device over a second communication path at substantially the same time as the audio emission is emitted by the second IoT device over the first communication path;
    detecting, at a second time point, the audio emission based on the monitoring;
    correlating the detected audio emission with the data packet based upon first correlation information that is embedded within the detected audio emission and configured to help identify a header field of the data packet; and
    calculating a distance estimate between the first and second IoT devices based at least in part upon the second time point.

2. The method of claim 1, wherein the calculating computes a time differential between the first time point and the second time point and generates the distance estimate based on the time differential.

3. The method of claim 1, further comprising:
    obtaining an estimate of network propagation latency associated with a communication path through which the second IoT device transmitted the data packet to the first IoT device; and
    adjusting the first time point based on the estimate of network propagation latency,
    wherein the calculating computes a time differential between the adjusted first time point and the second time point and generates the distance estimate based on the time differential.

4. The method of claim 3,
    wherein the estimate of network propagation latency is conveyed via another data packet that is exchanged between the first and second IoT devices, or
    wherein clocks at the first and second IoT devices are unsynchronized, and the estimate of network propagation latency is obtained by exchanging a series of corresponding audio emissions and data packets in accordance with a fixed transmission schedule and then averaging differences between arrival times of the series of corresponding audio emissions and data packets.

5. The method of claim 1,
    wherein a first clock running on the first IoT device is synchronized with a second clock running on the second IoT device,
    wherein the data packet includes an indication of a third time point at which the second IoT device transmitted the data packet according to the second clock,
    wherein the second time point is determined according to the first clock, and
    wherein the calculating computes a time differential between the second time point and the third time point from the data packet and generates the distance estimate based on the time differential.

6. The method of claim 1,
    wherein the data packet further includes second correlation information that is configured to help identify the detected audio emission, and
    wherein the detecting is based upon a comparison between the second correlation information and audio data being monitored by the monitoring.

7. The method of claim 6, wherein the second correlation information includes a dual-tone multi-frequency (DTMF) signature that characterizes the detected audio emission and/or a pulse-code modulation (PCM) signature that characterizes the detected audio emission.

8. The method of claim 1,
    wherein the first correlation information includes a sequence number of the data packet, and
    wherein the header field of the data packet is a sequence field of a header of the data packet.

9. The method of claim 1, wherein the second communication path over which the data packet is received corresponds to a direct communication path that includes a Bluetooth connection and/or a line-of-sight (LoS) light emission sequence.

10. The method of claim 1, wherein the second communication path over which the data packet is received corresponds to an indirect communication path that includes an Internet Protocol (IP) connection via an access point.

11. The method of claim 10, wherein the IP connection is based on a user datagram protocol (UDP).

12. The method of claim 1, further comprising:
    executing at least two more proximity detection procedures with at least two more IoT devices to calculate at least two more distance estimates to the at least two more IoT devices; and
    computing a position of the first IoT device via trilateration based on the distance estimate and the at least two more distance estimates.

13. The method of claim 1, wherein the first communication path over which the audio emission is output is a sound propagation medium.

14. The method of claim 1,
    wherein the determination to execute the proximity detection procedure is initiated by the first IoT device, or
    wherein the determination to execute the proximity detection procedure is initiated by the second IoT device.

15. The method of claim 1,
    wherein a first clock running on the first IoT device is synchronized with a second clock running on the second IoT device, wherein the data packet includes an indication of a time point at which the second IoT device transmitted the data packet according to the second clock.

16. A method of facilitating proximity detection between a first Internet of Things (IoT) device and a second IoT device at the second IoT device, comprising:
establishing a connection with the first IoT device;
determining to execute a proximity detection procedure with the first IoT device;
outputting, via an audio output device coupled to the second IoT device, an audio emission from the second IoT device over a first communication path in response to the determination; and
transmitting, at substantially the same time as the outputting of the audio emission over the first communication path, a data packet to the first IoT device over a second communication path, wherein the audio emission and the data packet are configured to be correlated with each other at the first IoT device in conjunction with the proximity detection procedure for calculation of a distance estimate between the first and second IoT devices based upon correlation information, and
wherein the correlation information includes first correlation information that is embedded within the audio emission and configured to help identify a header field of the data packet.

17. The method of claim 16, wherein the data packet further includes second correlation information that is configured to help identify the audio emission.

18. The method of claim 17, wherein the second correlation information includes a dual-tone multi-frequency (DTMF) signature that characterizes the audio emission and/or a pulse-code modulation (PCM) signature that characterizes the audio emission.

19. The method of claim 16,
wherein the first correlation information includes a sequence number of the data packet, and
wherein the header field of the data packet is a sequence field of a header of the data packet.

20. The method of claim 16, wherein the second communication path over which the data packet is transmitted corresponds to a direct communication path includes a Bluetooth connection and/or a line-of-sight (LoS) light emission sequence.

21. The method of claim 16, wherein the second communication path over which the data packet is transmitted corresponds to an indirect communication path includes an Internet Protocol (IP) connection via an access point.

22. The method of claim 21, wherein the IP connection is based on a user datagram protocol (UDP).

23. The method of claim 16, wherein the first communication path over which the audio emission is output is a sound propagation medium.

24. The method of claim 16,
wherein the determination to execute the proximity detection procedure is initiated by the first IoT device, or
wherein the determination to execute the proximity detection procedure is initiated by the second IoT device.

25. The method of claim 16,
wherein the proximity detection procedure is implemented in parallel with the first IoT device and at least one other IoT device by coordinating the audio emission to be output to both the first IoT device and the at least one other IoT device, and transmitting at least one other data packet to the at least one other IoT device at substantially the same time as the outputting of the audio emission.

26. The method of claim 16,
wherein a first clock running on the first IoT device is synchronized with a second clock running on the second IoT device,
wherein the data packet includes an indication of a time point at which the second IoT device transmitted the data packet according to the second clock.

27. A first Internet of Things (IoT) device that is configured to determine a proximity to a second IoT device, comprising:
means for establishing a connection with the second IoT device;
means for determining to execute a proximity detection procedure with the second IoT device;
means for monitoring, via a microphone coupled to the first IoT device, for an audio emission over a first communication path from the second IoT device in response to the determination;
means for receiving, at a first time point, a data packet that is transmitted by the second IoT device over a second communication path at substantially the same time as the audio emission is emitted by the second IoT device over the first communication path;
means for detecting, at a second time point, the audio emission based on the monitoring;
means for correlating the detected audio emission with the data packet based upon first correlation information that is embedded within the detected audio emission and configured to help identify a header field of the data packet; and
means for calculating a distance estimate between the first and second IoT devices based at least in part upon the second time point.

28. A second Internet of Things (IoT) device configured to facilitate proximity detection between a first IoT device and the second IoT device, comprising:
means for establishing a connection with the first IoT device;
means for determining to execute a proximity detection procedure with the first IoT device;
means for outputting, via an audio output device coupled to the second IoT device, an audio emission from the second IoT device over a first communication path in response to the determination; and
means for transmitting, at substantially the same time as the outputting of the audio emission over the first communication path, a data packet to the first IoT device over a second communication path, wherein the audio emission and the data packet are configured to be correlated with each other at the first IoT device in conjunction with the proximity detection procedure for calculation of a distance estimate between the first and second IoT devices based upon correlation information, and
wherein the correlation information includes first correlation information that is embedded within the audio emission and configured to help identify a header field of the data packet.

29. A first Internet of Things (IoT) device that is configured to determine a proximity to a second IoT device, comprising:
a processor, a memory and/or a transceiver configured to:
establish a connection with the second IoT device;
determine to execute a proximity detection procedure with the second IoT device;

monitor, via a microphone coupled to the first IoT device, for an audio emission over a first communication path from the second IoT device in response to the determination;

receive, at a first time point, a data packet that is transmitted by the second IoT device over a second communication path at substantially the same time as the audio emission is emitted by the second IoT device over the first communication path;

detect, at a second time point, the audio emission based on the monitoring;

correlate the detected audio emission with the data packet based upon first correlation information that is embedded within the detected audio emission and configured to help identify a header field of the data packet; and calculate a distance estimate between the first and second IoT devices based at least in part upon the second time point.

30. A second Internet of Things (IoT) device configured to facilitate proximity detection between a first IoT device and the second IoT device, comprising:

a processor, a memory and/or a transceiver configured to:
establish a connection with the first IoT device;
determine to execute a proximity detection procedure with the first IoT device;
output, via an audio output device coupled to the second IoT device, an audio emission from the second IoT device over a first communication path in response to the determination;
and transmit, at substantially the same time as the outputting of the audio emission over the first communication path, a data packet to the first IoT device over a second communication path, wherein the audio emission and the data packet are configured to be correlated with each other at the first IoT device in conjunction with the proximity detection procedure for calculation of a distance estimate between the first and second IoT devices based upon correlation information, and
wherein the correlation information includes first correlation information that is embedded within the audio emission and configured to help identify a header field of the data packet.

31. A non-transitory computer-readable medium containing instructions stored thereon, which, when executed by a first Internet of Things (IoT) device that is configured to determine a proximity to a second IoT device, causes the first IoT device to perform operations, the instructions comprising:

at least one instruction to cause the first IoT device to establish a connection with the second IoT device;

at least one instruction to cause the first IoT device to determine to execute a proximity detection procedure with the second IoT device;

at least one instruction to cause the first IoT device to monitor, via a microphone coupled to the first IoT device, for an audio emission over a first communication path from the second IoT device in response to the determination;

at least one instruction to cause the first IoT device to receive, at a first time point, a data packet that is transmitted by the second IoT device over a second communication path at substantially the same time as the audio emission is emitted by the second IoT device over the first communication path;

at least one instruction to cause the first IoT device to detect, at a second time point, the audio emission based on the monitoring;

at least one instruction to cause the first IoT device to correlate the detected audio emission with the data packet based upon first correlation information that is embedded within the detected audio emission and configured to help identify a header field of the data packet; and at least one instruction to cause the first IoT device to calculate a distance estimate between the first and second IoT devices based at least in part upon the second time point.

32. A non-transitory computer-readable medium containing instructions stored thereon, which, when executed by a second Internet of Things (IoT) device configured to facilitate proximity detection between a first IoT device and the second IoT device, causes the second IoT device to perform operations, the instructions comprising:

at least one instruction to cause the second IoT device to establish a connection with the first IoT device;

at least one instruction to cause the second IoT device to determine to execute a proximity detection procedure with the first IoT device;

at least one instruction to cause the second IoT device to output, via an audio output device coupled to the second IoT device, an audio emission from the second IoT device over a first communication path in response to the determination; and at least one instruction to cause the second IoT device to transmit, at substantially the same time as the outputting of the audio emission over the first communication path, a data packet to the first IoT device over a second communication path, wherein the audio emission and the data packet are configured to be correlated with each other at the first IoT device in conjunction with the proximity detection procedure for calculation of a distance estimate between the first and second IoT devices based upon correlation information, and wherein the correlation information includes first correlation information that is embedded within the audio emission and configured to help identify a header field of the data packet.

* * * * *